United States Patent
Sultenfuss et al.

(10) Patent No.: US 12,483,065 B2
(45) Date of Patent: Nov. 25, 2025

(54) WIRELESS CHARGER AS A GARAGED/DETACHABLE UNIT

(71) Applicant: DELL PRODUCTS L.P., Round Rock, TX (US)

(72) Inventors: Andrew Sultenfuss, Leander, TX (US); Jennifer Davis, Leander, TX (US); David William Grunow, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 583 days.

(21) Appl. No.: 17/968,885

(22) Filed: Oct. 19, 2022

(65) Prior Publication Data

US 2024/0136852 A1 Apr. 25, 2024
US 2024/0235258 A9 Jul. 11, 2024

(51) Int. Cl.
*H02J 7/00* (2006.01)
*H02J 50/00* (2016.01)
*H02J 50/10* (2016.01)

(52) U.S. Cl.
CPC .......... *H02J 50/005* (2020.01); *H02J 7/0044* (2013.01); *H02J 50/10* (2016.02)

(58) Field of Classification Search
CPC ......... H02J 50/005; H02J 50/10; H02J 7/0044
USPC ......................................... 320/108; 307/104
See application file for complete search history.

(56) References Cited

U.S. PATENT DOCUMENTS

| 8,410,751 | B2 | 4/2013 | Terao et al. | |
|---|---|---|---|---|
| 2012/0091952 | A1* | 4/2012 | Oshimi | H02J 50/005 320/108 |
| 2013/0175986 | A1* | 7/2013 | Senatori | G06F 1/266 320/108 |
| 2015/0244199 | A1 | 8/2015 | Chen | |
| 2023/0163607 | A1* | 5/2023 | Vanka | H02J 7/0044 320/108 |

* cited by examiner

*Primary Examiner* — Zixuan Zhou
(74) *Attorney, Agent, or Firm* — Larson Newman, LLP

(57) ABSTRACT

An information handling system includes a bottom case and a wireless charging puck. The bottom case includes a bay. The wireless charging puck fits into the bay, and is detachable from the bottom case. When the wireless charging puck is fitted into the bay, the wireless charging puck is configured as a power receiving unit to receive wireless power. When the wireless charging puck is detached from the bay, the wireless charging puck is configured as a power transmitting unit to provide wireless power to an external device.

20 Claims, 3 Drawing Sheets

(Top view)

*(Top view)*

*(Bottom view)*

*(Top view)*

*(Bottom view)*

WIRELESS CHARGER AS A GARAGED/DETACHABLE UNIT

FIELD OF THE DISCLOSURE

This disclosure generally relates to information handling systems, and more particularly relates to providing a bilateral charging mode wireless charger as a garaged/detachable unit in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a bottom case and a wireless charging puck. The bottom case includes a bay. The wireless charging puck may fit into the bay, and may be detachable from the bottom case. When the wireless charging puck is fitted into the bay, the wireless charging puck may be configured as a power receiving unit to receive wireless power. When the wireless charging puck is detached from the bay, the wireless charging puck may be configured as a power transmitting unit to provide wireless power to an external device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1A:
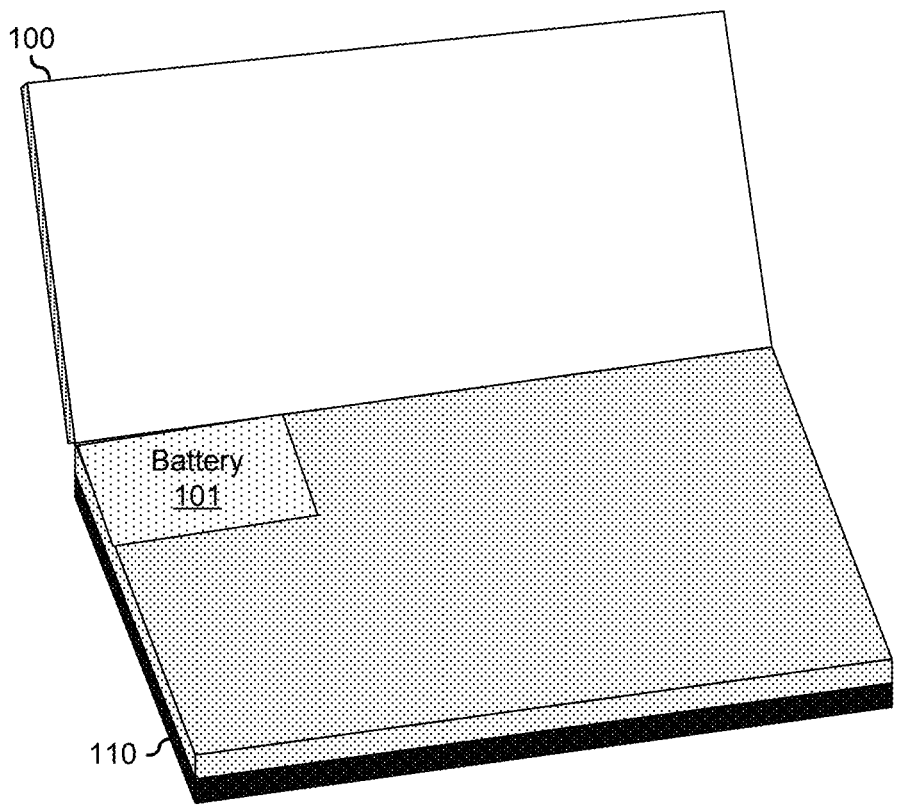
FIG. 1A is a perspective view of a top of an information handling system according to an embodiment of the current disclosure in an open position.
Figure 1B:
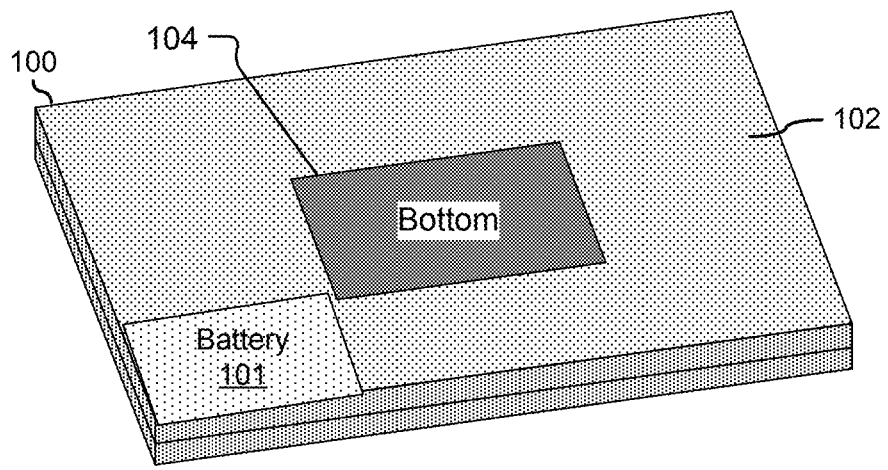
FIG. 1B is a perspective view of a bottom of the information handling system in a closed position.

FIG. 1A illustrates an information handling system 100 that is positioned atop a wireless charging pad 110, and FIG. 1B illustrates a bottom view of the information handling system. Information handling system 100 is illustrated as representing a laptop computer system. However information handling system 100 may likewise be understood to represent other types of systems such as a tablet device, or another type of system that is intended for mobile, battery powered operation. In particular, information handling system 100 represents any type of computing device that is configured to have an internal battery system that is wirelessly chargeable via wireless charging pad 110. In this regard, information handling system 100 includes a wireless charging puck 104 embedded in a bottom case 102 at the bottom of the information handling system.

Wireless charging puck 104 is configured to receive power wirelessly from wireless charging pad 110 when information handling system 100 is placed atop the wireless charging pad. Wireless charging pad 110 includes a power source (not illustrated), such as an AC adaptor or the like. In the illustrated operating mode wireless charging pad 110 provides power to wireless charging puck 104 to charge a battery 101 of information handling system 100 while a user is operating the information handling system. In this case, wireless charging pad 110 operates as a power transmitting unit (PTU) while wireless charging puck 104 operates as a power receiving unit (PRU). The transfer of power from wireless charging pad 110 to wireless charging puck 104 may be provided in accordance with a particular wireless charging and power transmission standard, such as a Qi protocol in accordance with one or more wireless charging specification published by the Wireless Power Consortium (WPC), a Power Matters Alliance (PWA) protocol in accordance with one or more wireless charging specifications published by the AirFuel Alliance, a near-field communications wireless charging protocol, or the like.

In a typical information handling system, the functions and features of wireless charging puck 104, as it relates to the wireless charging puck's operation as a PRU, are integrated into a bottom case of the information handling system. In this case, the information handling system typically only operates as a PRU, and any capability of the information handling system to provide power to other external devices, such as a cellular device, a tablet device, or the like, is provided by an externally attached wireless charging device that is connectable to the information handling system and that operates as a PTU for the external device. Such an externally attached wireless charging device may typically be connected to the information handling system by a USB-C cable between the externally attached wireless charging device and the information handling system. Such a solution for charging other external devices thus involves the cumbersome transportation of additional devices (that is, the externally attached wireless charging device) and cabling (that is, the USB-C cable).

Figure 2A:
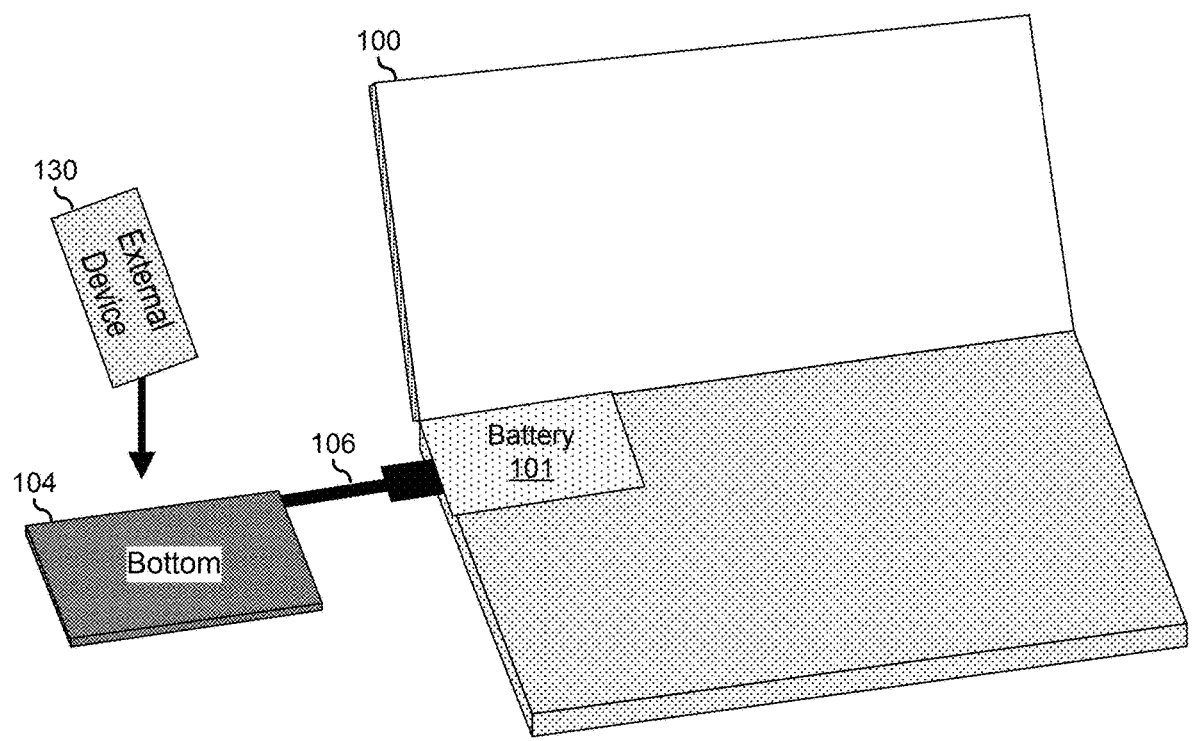
FIG. 2A is a perspective view of the top of the information handling system in an open position.
Figure 2B:
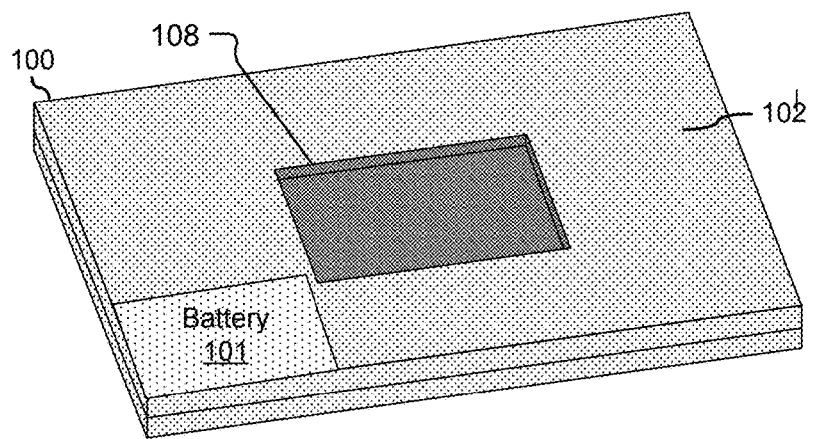
FIG. 2B is a perspective view of the bottom of the information handling system of FIG. 2A.

In a particular embodiment, wireless charging puck 104 is configured in a first mode to operate as a PRU, as described above, and is configured in a second mode to operate as a PTU. In this regard, wireless charging puck 104 is detachable from bottom case 102 and can be plugged into information handling system 100 to operate as an externally attached wireless charging device. FIG. 2A illustrates a top view of information handling system 100 with wireless charging puck 104 removed from bottom case 102 and is plugged into information handling system 100 via a cable 106. FIG. 2B illustrates a bottom view of information handling system 100 with wireless charging puck 104 removed from bottom case 102, leaving a bay 108 in the bottom of the information handling system. An external device 130 can then be placed atop wireless charging puck 104 to receive power from a battery 101 of information handling system 100.

When wireless charging puck 104 is attached within bay 108, the wireless charging puck may be referred to as garaged within information handling system 100, and when the wireless charging puck is removed from the void, the wireless charging puck may be referred to as detached from the information handling system. A typical wireless charging device operates in a preferred orientation that maximizes the energy transfer efficiency between the PTU and PRU. In this regard, wireless charging puck 104 is configured such that a bottom-down orientation in the garaged configuration maximizes energy transfer efficiency between information handling system 100 and wireless charging pad 110. Similarly, in the detached configuration, wireless charging puck 104 is provided in a bottom-up orientation to maximize the energy transfer efficiency between the wireless charging puck and external device 130.

Wireless charging puck 104 includes a system connector configured to engage with a complimentary connector in information handling system 100 when the wireless charging puck is garaged in bay 108. In a particular embodiment, the system connector includes hard-wired signal contacts that configure wireless charging puck 104 to receive power from wireless charging pad 110 at a high-power transfer rate, in order to rapidly charge the battery 101 of information handling system 100. In another embodiment, the system connector includes a management interface, such as a two-wire interface, and information handling system 100 negotiates a power transfer rate with wireless charging puck 104 to optimize the charging of the battery 101, for example, to avoid overheating of the battery 101 or the like. An example of a two-wire interface includes an I2C interface, an I3C interface, a LPC interface, a SPI interface, or the like.

In a particular embodiment, cable 106 represents a power connector tail that is integrated with wireless charging puck 104. In this embodiment, cable 106 is hard wired at a first end to wireless charging puck 104, and a second end of the cable includes a connector that is plugged into a complimentary connector socket in information handling system 100. For example, the connector may represent a USB-C connector that can be plugged into a USB-C socket in a side or back port of information handling system 100. In this way, a user of information handling system 100 retains flexibility to place wireless charging puck 104 in a convenient location based on the user's preferences. In another embodiment, cable 106 tethers the wireless charging puck 104 to information handling system 100. In this embodiment, cable 106 is hard wired at a first end to wireless charging puck 104, and a second end of the cable is hard wired to information handling system 100, for example within bay 108. In this way, it is difficult to lose the wireless charging puck, as it is tethered to information handling system 100. In either of the above embodiments, cable 106 can be wrapped around one or more edges of wireless charging puck for storage when the wireless charging puck is garaged within bay 108.

In another embodiment, in addition to cable 106, wireless charging puck 104 includes a socket, such as a USB-C socket. In this way, a user of information handling system 100 may opt to not connect cable 106 to information handling system 100, but may connect a separate cable between wireless charging puck 104 and information handling system 100. For example, the separate cable may be longer than cable 106, providing the user with maximum flexibility in locating wireless charging puck 104 when the wireless charging puck is detached from bay 108.

Figure 3:
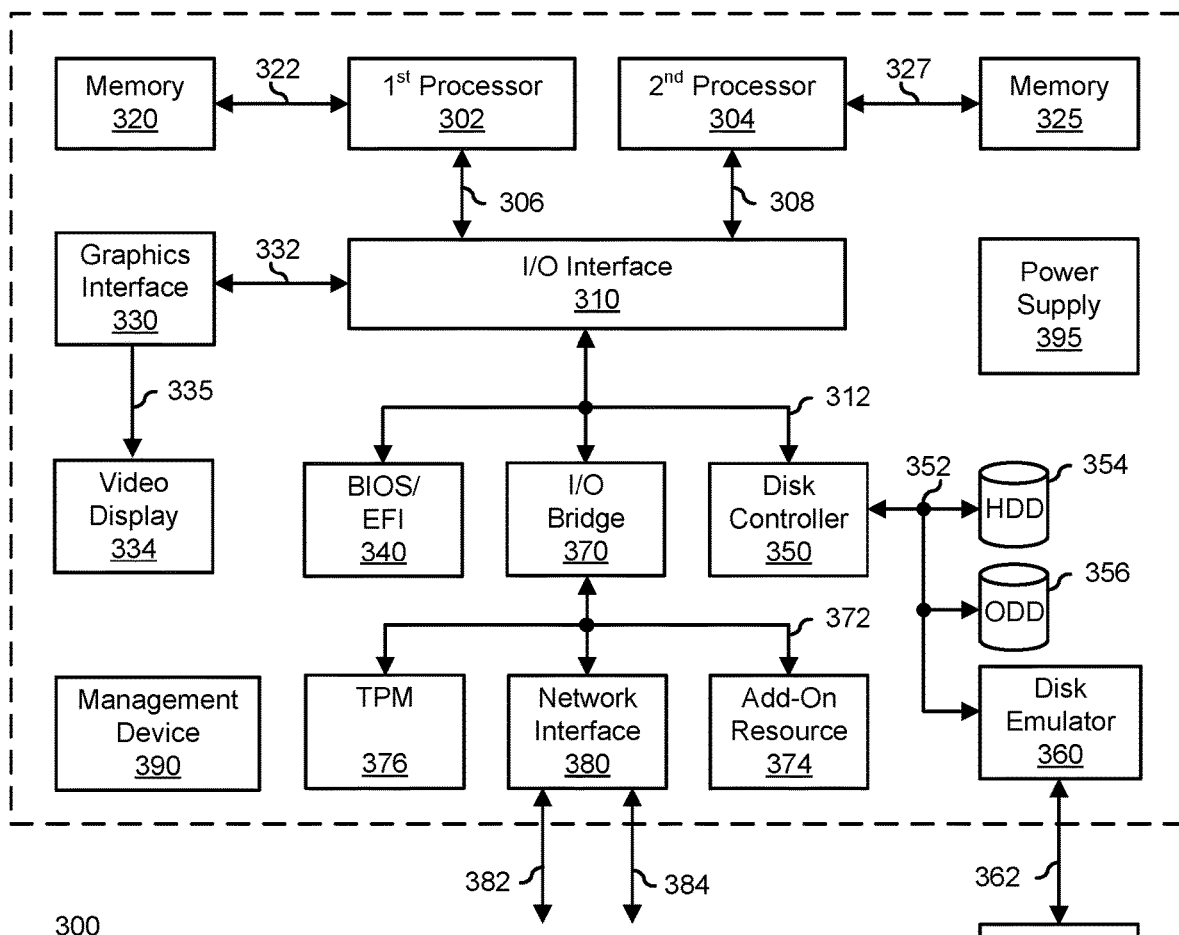
FIG. 3 is a block diagram illustrating a generalized information handling system according to another embodiment of the present disclosure.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 364, an I/O bridge 370, one or more add-on resources 374, a trusted platform module (TPM) 376, a network interface 380, a management device 390, and a power supply 395. Processors 302 and 304, I/O interface 310, memory 320 and 325, graphics interface 330, BIOS/UEFI module 340, disk controller 350, HDD 354, ODD 356, disk emulator 360, SSD 364, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 335 to a video display 334. In a particular embodiment, information handling system 300 includes separate memories that are dedicated to each of processors 302 and 304 via separate memory interfaces. An example of memories 320 and 325 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on a separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 includes a commercially available BMC product or other device that operates in accordance with an Intelligent Platform Management Initiative (IPMI) specification, a Web Services Management (WS-Man) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a bottom case including a battery and a bay; and
   a wireless charging puck configured to fit into the bay, wherein the wireless charging puck is detachable from the bottom case;
   wherein when the wireless charging puck is fitted into the bay, the wireless charging puck is configured as a power receiving unit to receive wireless power to charge the battery; and
   wherein when the wireless charging puck is detached from the bay, the wireless charging puck is configured as a power transmitting unit to provide wireless power to an external device from the battery.

2. The information handling system of claim 1, wherein the wireless charging puck includes a system connector configured to plug into a complimentary connector in the bay when the wireless charging puck is fitted into the bay.

3. The information handling system of claim 2, wherein the wireless charging puck receives an indication from the system connector to enable a maximum charging rate when the wireless charging puck is fitted into the bay.

4. The information handling system of claim 1, wherein the wireless charging puck receives an indication from the information handling system to negotiate a charging rate for the external device when the wireless charging puck is detached from the bay.

5. The information handling system of claim 1, further comprising a cable configured to couple the wireless charging puck to the information handling system when the wireless charging puck is detached from the bay.

6. The information handling system of claim 5, wherein the cable is hard wired at a first end to the wireless charging puck.

7. The information handling system of claim 6, wherein the cable includes a connector at a second end.

8. The information handling system of claim 7, wherein the connector includes a USB-C connector.

9. The information handling system of claim 6, wherein the cable is wrapped around at least one edge of the wireless charging puck when the wireless charging puck is fitted into the bay.

10. The information handling system of claim 1, wherein the wireless charging puck is a Qi wireless charging puck.

11. A method, comprising:
    providing, in an information handling system, a bottom case including a battery and a bay;
    fitting, within the bay, a wireless charging puck, wherein the wireless charging puck is detachable from the bottom case;
    when the wireless charging puck is fitted into the bay, operating the wireless charging puck as a power receiving unit to receive wireless power to charge the battery; and
    when the wireless charging puck is detached from the bay, operating the wireless charging puck as a power transmitting unit to provide wireless power to an external device from the battery.

12. The method of claim 11, further comprising when the wireless charging puck is fitted into the bay, connecting a system connector of the wireless charging puck includes to a complimentary connector in the bay.

13. The method of claim 12, further comprising receiving, by the wireless charging puck, an indication from the system connector to enable a maximum charging rate when the wireless charging puck is fitted into the bay.

14. The method of claim 11, further comprising receiving, by the wireless charging puck, an indication from the information handling system to negotiate a charging rate for the external device when the wireless charging puck is detached from the bay.

15. The method of claim 11, further comprising coupling the wireless charging puck to the information handling system by a cable when the wireless charging puck is detached from the bay.

16. The method of claim 15, further comprising hard wiring the cable at a first end to the wireless charging puck.

17. The method of claim 16, wherein the cable includes a connector at a second end.

18. The method of claim 17, wherein the connector includes a USB-C connector.

19. The method of claim 16, further comprising wrapping the cable around at least one edge of the wireless charging puck when the wireless charging puck is fitted into the bay.

20. An information handling system, comprising:
    a battery;
    a bay; and
    a wireless charging puck configured to fit into the bay;
    wherein the wireless charging puck is configured as a power receiving unit to receive wireless power to charge the battery when fitting into the bay, and is configured as a power transmitting unit to provide power from the battery when detached from the bay.

* * * * *